Figure 1:
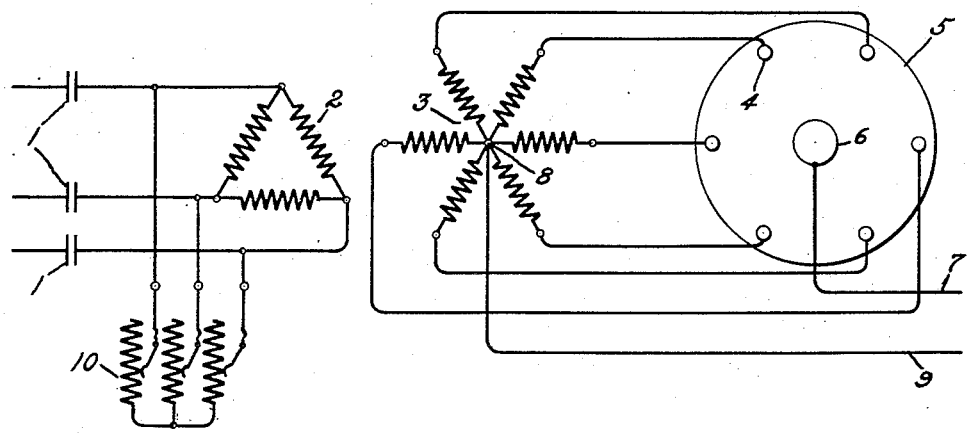

April 20, 1926.

H. M. HOBART 1,581,948

DIRECT CURRENT VOLTAGE CONTROL OF CONVERTER SYSTEMS

Filed April 4, 1922     2 Sheets-Sheet 1

Inventor:
Henry M. Hobart,
by Albert G. Davis
His Attorney.

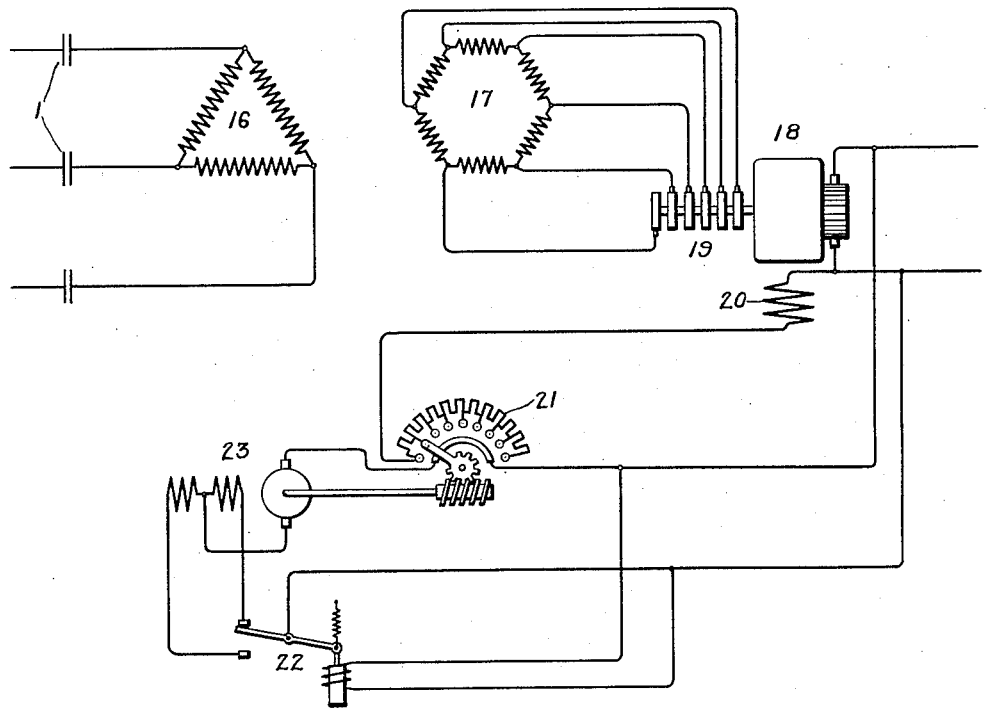

Patented Apr. 20, 1926.

1,581,948

UNITED STATES PATENT OFFICE.

HENRY M. HOBART, OF SCHENECTADY, NEW YORK, ASSIGNOR TO GENERAL ELECTRIC COMPANY, A CORPORATION OF NEW YORK.

DIRECT-CURRENT VOLTAGE CONTROL OF CONVERTER SYSTEMS.

Application filed April 4, 1922. Serial No. 549,626.

*To all whom it may concern:*

Be it known that I, HENRY M. HOBART, a citizen of the United States, residing at Schenectady, in the county of Schenectady, State of New York, have invented certain new and useful Improvements in Direct-Current Voltage Controls of Converter Systems, of which the following is a specification.

My invention relates to the voltage control of direct current systems which are supplied from an alternating current source through such apparatus as mercury arc rectifiers and synchronous converters. In these types of converting systems the direct current voltage bears a definite relation to the alternating current voltage. The principal object of my invention is to control the alternating current voltage supplied to the converting apparatus, and thus the direct current voltage, by varying the wattless current flowing through condensing apparatus connected in series in the alternating current supply or, when, as usual, the rectifying apparatus consumes a current with a fairly constant wattless component, by adjusting the capacity of a condenser of the synchronous type, connected in series in the alternating current supply, by means of adjusting the field strength of the series connected synchronous condenser. Other advantages of my improved system will appear as the description proceeds.

The features of my invention which I believe to be novel and patentable will be pointed out in the claims appended hereto. The preferred arrangement of the apparatus used and its method of operation will be described in connection with the accompanying drawings in which Fig. 1 diagrammatically represents my invention applied to a mercury vapor converter system in which the voltage control is accomplished by an adjustable shunt reactor and series condensers, Fig. 2 diagrammatically represents a mercury vapor converter system where an adjustable series condenser of the synchronous type is used for voltage control and Fig. 3 represents the application of my invention to a rotary converter instead of a vapor converter.

A serious disadvantage of the mercury arc rectifier with its transformer as compared with a motor generator, for transforming high voltage polyphase electricity into direct current electricity, is that the mercury arc rectifier's direct current voltage decreases with the load whereas with a motor generator set any desired direct current voltage characteristic can be provided. My invention relates to means by which I can control the direct current voltage at the terminals of a mercury arc rectifier, and it is also applicable to synchronous converters. I will first describe my invention as applied to the control of the voltage of a mercury arc rectifier. In Fig. 1, I show at 1 three static condensers inserted in series in a high voltage, three phase, alternating current circuit coming into the sub-station. 2 represents the mesh connected primary windings of a stepdown transformer. 3 represents the star connected 6-phase secondary windings of the transformer. From the six outer ends of the star, connections are carried to the six anodes 4 of a mercury arc rectifier 5, from the cathode 6 of which is supplied one side 7 of a direct current circuit, while the neutral point 8 of the star connected secondary windings 3 is connected to 9, the other side of the direct current circuit. 10 is an adjustable 3-phase reactor connected into the supply circuit between the condensers 1 and the primary terminals of the stepdown transformer 2. By decreasing the reactance in the three branches of 10, I can increase the lagging current through the condensers 1 and this will raise the potential at the primary terminals of the transformer 2 and will tend to increase also the direct current voltage at the terminals 7, 9 of the direct current circuit. I need not put the condensers 1 directly in the high voltage lines, but can locate them in the secondaries of stepdown transformers and I can also deal similarly with the reactor 10.

In order to protect the condensers 1 in case of a short circuit they may be provided with lightning arrestors or saturated magnetic circuits or suitably adjusted spark gaps connected in parallel therewith.

Figure 2:
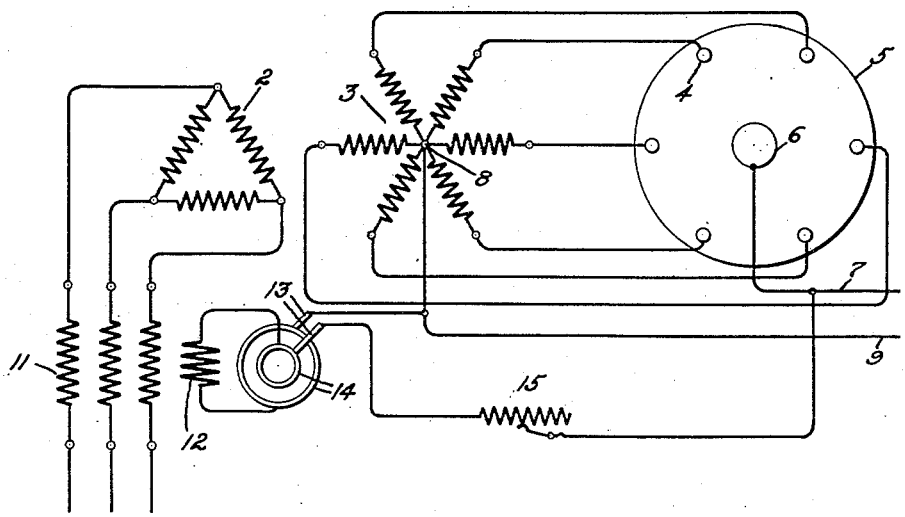

The arrangement which I show in Fig. 1 is the simplest for explanatory purposes and illustrates the underlying principle of this means of control, which is to regulate the voltage by increasing or decreasing the wattless current carried through condensers located in series on the way to the load. But (especially for mercury arc rectifier substations) there is an objection to the arrangement shown in Fig. 1, namely, that the static condensers 1 represent non-adjustable capacities, i. e., capacities of fixed value, which necessitates using an adjustable reactor. It will usually be preferable to substitute in place of 1 the three stator windings corresponding to the three phases of a synchronous condenser and to operate this synchronous condenser with such high direct current excitation of its field winding as shall provide the equivalent of the desired capacity. By adjustment (automatic or otherwise) of the direct current excitation, I can provide the equivalent of any desired capacitance. By thus providing means for varying the capacitance I dispense with the need for providing an adjustable reactor to take the place of 10 and I accept whatever reactance is associated with the load consisting of the transformer, its rectifier and all the associated gear.

Since the current consumed by a transformer when supplying a mercury arc rectifier is always lagging, this method of voltage control is particularly applicable to the case of a mercury arc rectifier supplied from a static transformer and is preferable to fitting the transformer with voltage taps.

The arrangement is shown diagrammatically in Fig. 2 in which 11 are the three stator windings of a synchronous condenser. These stator windings 11 are inserted in series in the high voltage circuit supplying the delta connected primary 2 of the stepdown transformer, whose 6-phase star connected secondaries 3 are connected from their outer ends of the six anodes 4 of a mercury arc rectifier 5. From the cathode 6 of this mercury arc rectifier, connection is made to one side 7 of the direct current circuit. From the neutral point 8 of the star connected secondaries 3 connection is made to the other side 9 of the direct current circuit. 12 is the direct current excited field of the synchronous condenser and direct current is supplied to 12 over brushes 13 and slip rings 14 from any suitable source such, for example, as the direct current means 7 and 9. For any given reactance of the system consisting of the stepdown transformer and the apparatus and circuits which it supplies, and for any load, the equivalent of any desired capacitance can be supplied in the windings 11 by suitable direct current excitation of the field 12.

By means of a suitable voltage regulator, (such as the Tirrell regulator), these adjustments can be automatically effected to maintain any desired voltage at the direct current terminals, i. e., between points 7 and 9, and also, by known means the voltage regulator can be arranged to automatically provide increasing voltage between 7 and 9 with increasing load in the direct current circuit. A manually controlled regulator is shown at 15 in Fig. 2 and an automatic regulator of the character specified is represented at 21, 22, and 23 in Fig. 3.

When, in a sub-station, instead of a mercury arc rectifier, a synchronous converter is used it has been practicable to obtain a control of the direct current voltage delivered from the commutator of the synchronous converter by fitting the fields of the synchronous converter with a compound winding. The compound winding is usually so adjusted that for less than three-quarter load, the current consumed by the synchronous converter is lagging while for loads above three-quarters the current is leading. It is only practicable to employ this means in synchronous converters to a limited extent since if, at full load or overloads, the current leads to any considerable extent, the neutralization in the armature winding of the motor component of the current and the generator component of the current, becomes very much less complete and the heating of the armature winding becomes much greater than for unity power factor. This heating becomes very serious indeed at local points in the winding, and for the very heavy overloads which must occasionally be carried by railway synchronous converters for short periods, the heating soon becomes prohibitive. Thus with 6-phase, 60 cycle designs with 50 per cent compounding, and adjusted for unity power factor at three-quarters load, the rise of temperature of the hottest parts of the armature winding when called upon to carry temporary overloads of 100 per cent will usually be of the order of ten degrees per minute. Thus it is evident that, other things being equal, it would be desirable to run a synchronous converter with the field adjustments such that the current should always, or at any rate at overloads, be at or near unity power factor, in which case the motor and generator components of the current approximate far better to a condition of mutual neutralization than is the case with a lagging or leading motor component. This adjustment for a high power factor at all loads is provided by a shunt synchronous converter, but its voltage regulation is bad. By the application of my invention to the case of a transformer supplying a shunt synchronous converter, I may so adjust the shunt excitation of the synchronous converter as to have it consume a slightly lagging current, and this permits of obtaining voltage regulation of the direct current circuit by automatic or manual adjustment of the field of the synchronous condenser. Such an arrangement is represented in Fig. 3 where the incoming transmission line has condenser apparatus 1 inserted therein. The transmission line feeds the primary 16 of a phase multiplying transformer, the secondary 17 of which is connected to the alternating current end of the rotary converter 18 through the slip rings 19. 20 indicates the shunt field of the rotary converter. The field current may be automatically adjusted by the motor operated rheostat 21. The direction of rotation and the circuit of the operating motor 23 is controlled by a regulator 22 responsive to the direct current voltage of the converter 18.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim as new and desire to secure by Letters Patent of the United States is:—

1. A system for converting alternating current to direct current comprising a converter of a type wherein the direct current and alternating current voltages are interdependent, condenser apparatus in the alternating current supply circuit of said converter, and means associated with said supply circuit for varying the wattless current flowing through said condenser apparatus for the purpose of varying the direct current voltage of said converter.

2. A converting system comprising in combination a source of alternating current, apparatus for converting alternating current into direct current supplied from said source, said apparatus being of the type in which the alternating and direct current voltages bear a definite relation to each other, direct current mains supplied by said apparatus, condensing apparatus connected in series between the alternating current supply lines and said converting apparatus, and means for varying the wattless current flowing through said condensing apparatus whereby the voltage of the direct current mains may be controlled.

3. A converting system comprising in combination a source of alternating current of commercial phase and frequency, apparatus for converting alternating current into direct current supplied from said source, said apparatus being of the type in which the alternating current and direct current voltages are interdependent, a phase multiplying transformer between said apparatus and said source, condensing apparatus connected in series with the primary of said transformer and adjustable means located on the primary side of said transformer for varying the wattless current flowing through the condensing apparatus whereby the direct current voltage supplied by said system may be controlled.

4. A system for converting alternating current to direct current comprising a converter of a type wherein the direct current and alternating current voltages are interdependent, condenser apparatus connected in the alternating current supply circuit to said converter, means for causing a lagging current to flow through said condenser apparatus, and means for varying the relation between the capacity of said condenser apparatus and the magnitude of the lagging current flowing therethrough.

In witness whereof, I have hereunto set my hand this 3rd day of April, 1922.

HENRY M. HOBART.